United States Patent
Hsu et al.

(10) Patent No.: US 8,114,499 B2
(45) Date of Patent: *Feb. 14, 2012

(54) OPTICAL FILM CONTAINING ORGANIC PARTICLES HAVING NARROW PARTICLE SIZE DISTRIBUTION

(75) Inventors: Lung-Lin Hsu, Kaohsiung (TW); Chun-Ting Wang, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 883 days.

This patent is subject to a terminal disclaimer.

(21) Appl. No.: 12/157,161

(22) Filed: Jun. 6, 2008

(65) Prior Publication Data
US 2008/0305301 A1   Dec. 11, 2008

(30) Foreign Application Priority Data

Jun. 8, 2007   (TW) ............................... 96120913 A

(51) Int. Cl.
*B32B 5/16* (2006.01)
*B32B 1/00* (2006.01)
*B32B 3/00* (2006.01)
*D06N 7/00* (2006.01)
*D06N 7/04* (2006.01)

(52) U.S. Cl. ........ 428/147; 428/323; 428/327; 428/174; 428/143

(58) Field of Classification Search .................. 428/323, 428/327, 147, 143, 174, 412, 423.7, 473.5, 428/480, 423.1
See application file for complete search history.

(56) References Cited

U.S. PATENT DOCUMENTS

| 6,871,994 | B2 | 3/2005 | Harada et al. |
| 7,542,207 | B2 | 6/2009 | Matsunaga |
| 7,833,622 | B2 * | 11/2010 | Hsu et al. ...................... 428/327 |
| 2003/0216497 | A1 | 11/2003 | Nakagawa et al. |
| 2005/0063062 | A1 | 3/2005 | Ito et al. |
| 2006/0186803 | A1 | 8/2006 | Lim et al. |
| 2007/0053080 | A1 | 3/2007 | Harada |

(Continued)

FOREIGN PATENT DOCUMENTS

JP   2006-162846   6/2006

(Continued)

OTHER PUBLICATIONS

Office Action of Japanese Application 2008-149820 Issued Jan. 11, 2011.

(Continued)

*Primary Examiner* — Catherine A Simone
(74) *Attorney, Agent, or Firm* — Ladas & Parry LLP

(57) ABSTRACT

The subject invention provides an optical film comprising a substrate and a resin coating having a convex-concave structure on at least one surface of the substrate, wherein said resin coating comprises a plurality of organic particles and a binder, the organic particles being formed from a polyacrylate resin which comprises at least one multi-functional acrylate monomer as polymerization units, and said multi-functional acrylate monomer is in an amount from 30 wt % to 70 wt % based on the total weight of the monomers, and wherein the organic particles have a single mean particle size, the particle size distribution of the organic particles ranges within about ±30% of the mean particle size, and the organic particles are in an amount from about 110 to about 360 parts by weight per 100 parts by weight of the solids content of the binder.

31 Claims, 5 Drawing Sheets

U.S. PATENT DOCUMENTS

2007/0184260 A1 8/2007 Saito et al.
2008/0311351 A1* 12/2008 Hsu et al. .................. 428/174

FOREIGN PATENT DOCUMENTS

| JP | 2006-171724 | 6/2006 |
| JP | 2006-236968 | 9/2006 |
| JP | 2007-65160 | 3/2007 |
| TW | 200303265 A | 2/2003 |
| TW | 200305031 A | 9/2003 |
| TW | 1263821 | 7/2005 |
| TW | 1235253 | 10/2006 |

OTHER PUBLICATIONS

English Abstract of Japanese Application 2006-162846 Published Jun. 22, 2006.
English Abstract of Japanese Application 2006-171724 Published Jun. 29, 2006.

* cited by examiner

OPTICAL FILM CONTAINING ORGANIC PARTICLES HAVING NARROW PARTICLE SIZE DISTRIBUTION

BACKGROUND OF THE INVENTION

1. Field of the Invention

The present invention relates to an optical film. In particular, the present invention relates to a diffusion film applicable to a backlight module.

2. Description of the Prior Art

Since liquid crystal panels cannot emit light, it is necessary to use a backlight module as a light source to offer sufficient and uniformly distributed light, so that the display device can display images normally.

Backlight modules can be substantially classified into two types, i.e., direct type and side type backlight modules. Direct type backlight modules have a light source disposed right below a diffusion plate and are generally utilized in a display device with a relatively large size, for example, TV sets. As for the side type backlight modules, the light source is disposed at the sides of the light guide plate, so that the light source emits light after being guided in a correct direction by the light guide plate. Generally, the side type backlight modules are applicable in a display device with a relatively small size, for example, notebook computers and monitors. However, both in the direct type and side type backlight modules, in order to eliminate the alternating bright-and-dark strips or mesh points, a diffusion film must be disposed above the light guide plate or the diffusion plate so as to uniformize the light, and to provide liquid crystal displays with a uniform surface light source.

Conventional diffusion films are mainly formed by applying a diffusion layer on a transparent substrate, the diffusion layer comprising a resin binder and chemical particles serving as diffusion particles. Once the light passes through the diffusion layer, the light will be refracted, reflected, and scattered because it passed through two media with different refractive indexes, so that the light can be effectively diffused, thereby achieving light uniformity. However, owing to the properties of the materials and the chemical particles involved, the light will be inevitably absorbed and scattered randomly, so that a portion of the light source is wasted and the light source cannot be efficiently utilized.

The diffusion particles normally used in the prior art have a particle size in the range of 1 μm to 50 μm. In order to enhance the light diffusion effect by increasing the coating area of the diffusion particles in the diffusion layer, it is known that particles with different particle sizes can be used as diffusion particles. As shown in FIG. 1, for a conventional diffusion film, a resin coating 103 containing a plurality of particles 105 with different particle sizes and a binder 104 is formed on a substrate 101. The diffusion particles used in the prior art have a wide particle size distribution. For example, when the particles used have a mean particle size of about 15 μm, the particle size distribution of the particles generally ranges from about 1 μm to about 30 μm. Although the light diffusion effect can be improved by using diffusion particles with different particle sizes, the light will be scattered randomly due to the different particle sizes of the particles, and as a result, the light source cannot be efficiently utilized.

It is known that, if the diffusion particles in the coating are aggregated or adhered to each other, not only is the light diffusion uniformity affected, but dark spots are also likely to be generated on the surface of the display. In order to solve the above problems, U.S. Pat. No. 7,218,450 B2 discloses using one or more organic or inorganic particles with a single distribution as diffusion particles with certain parameters, including the lamination ratio, particle size of the flocculated particles, and when two kinds of particles with a single distribution are used, the mean particle sizes of the two kinds of particles with a single distribution, that meet special formulae. 95% of the particles with a single distribution used in U.S. Pat. No. 7,218,450 B2 have a particle size ranging within ±15% of the mean particle size. U.S. Pat. No. 7,218,450 B2 further teaches using diffusion particles having a narrow particle size distribution, but is silent on the crosslinking degree of the diffusion particles. In fact, an insufficient crosslinking degree of the diffusion particles will inevitably cause some problems. For example, particles with a low crosslinking degree are likely to interact with the solvent in the binder and thus swell up. Therefore, compared with the particles with a high crosslinking degree, the particles with a low crosslinking degree will have a low solvent resistance. Furthermore, as the volume of the particles with a low crosslinking degree is changed because the solvent is absorbed, the optical properties of the particles become unstable, and the viscosity on the surfaces of the particles increases, so that the particles are easily aggregated with each other, thereby further affecting the coating processibility and light diffusion effects of the diffusion film.

In addition, in various optical films, the brightness enhancement film is relatively expensive, so in the newly developed backlight module structures, modifications were made to the other optical films and the combinations thereof so as to substitute for the brightness enhancement film and to reduce the cost. For example, in liquid crystal displays, two or three diffusion films were used to replace the conventional design of the brightness enhancement film with two diffusion films respectively located on and below the brightness enhancement film. Nevertheless, the brightness and the other performances are inferior compared with the conventional design. Therefore, for current techniques, the design of the diffusion film not only focuses on meeting the light diffusion efficiency requirement, but the means of improving the brightness of the diffusion film also needs to be considered.

SUMMARY OF THE INVENTION

The present invention provides an optical film capable of meeting the requirement of light diffusion efficiency and having desirable brightness.

The present invention also provides an optical film containing organic particles having a narrow particle size distribution, where the organic particles can effectively improve the brightness of the optical film.

The present invention further provides an optical film containing highly crosslinked organic particles that are solvent resistant and can prevent the organic particles from swelling up, resulting in the unstability of the optical properties of the film. Meanwhile, by increasing the crosslinking degree of the organic particles, the hardness of the organic particles is enhanced, so as to enhance their the scratch resistance and wear resistance.

In order to achieve the above objectives, the present invention provides an optical film comprising a substrate and a resin coating having a convex-concave structure on at least one surface of the substrate, the resin coating including a plurality of organic particles that can serve as diffusion particles and a binder. The organic particles are polyacrylate resin particles, wherein the polyacrylate resin comprises at least one mono-functional acrylate monomer and at least one multi-functional acrylate monomer as the polymerization units, and the multi-functional acrylate monomers are in an amount from about 30 wt % to 70 wt % based on the total weight of the monomers; the organic particles have a single mean particle size; the particle size distribution of the organic particles ranges within about ±30% of the mean particle size; and the organic particles are in an amount from about 110 to about 360 parts by weight per 100 parts by weight of the solids content of the binder.

DETAILED DESCRIPTION OF THE INVENTION

The optical film of the present invention is illustrated below in detail by the embodiments with reference to the drawings, which are not intended to limit the scope of the present invention. It will be apparent that any modifications or alterations that can easily be accomplished by those having ordinary skill in the art fall within the scope of the disclosure of the specification.

Figure 1:
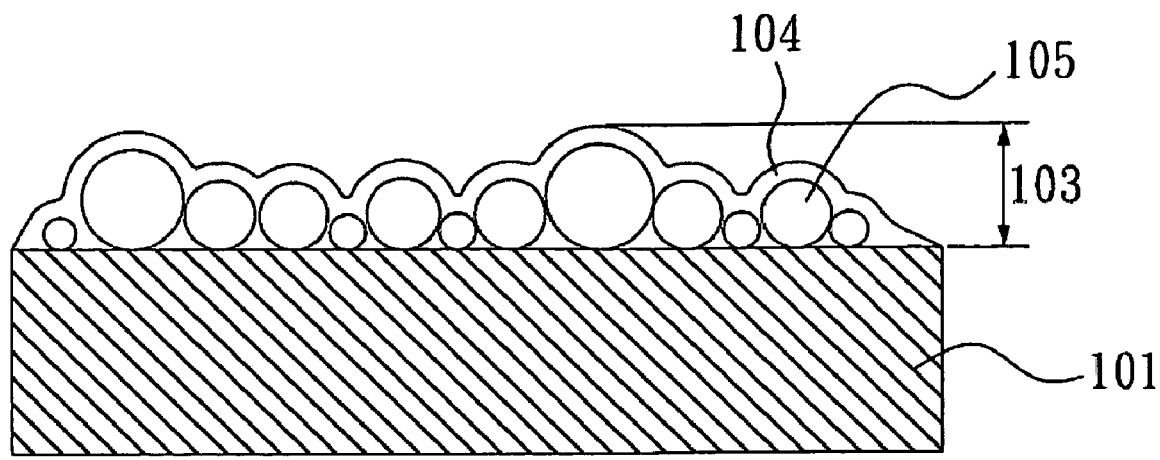
FIG. 1 is a schematic view of a conventional diffusion film.
Figure 2:
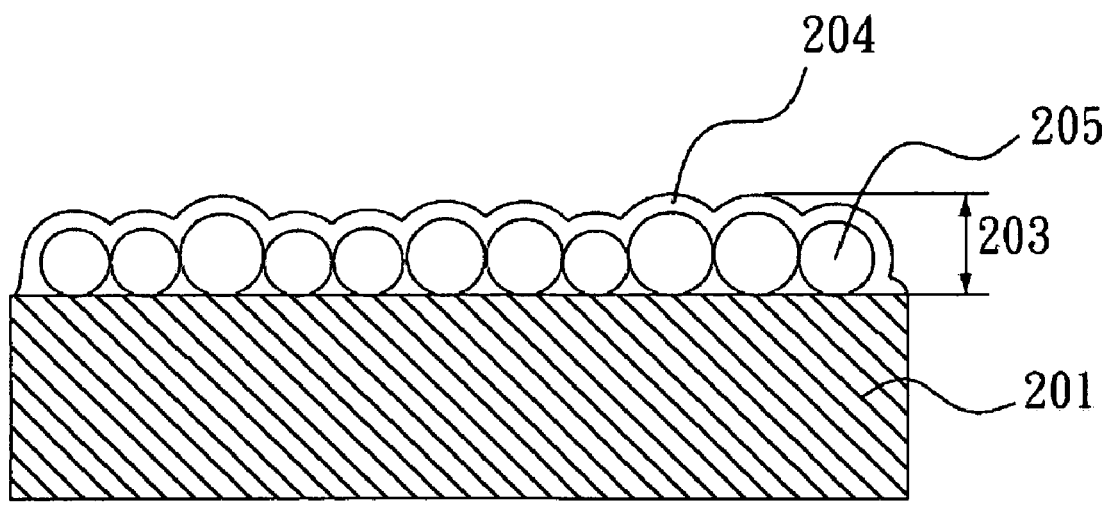
FIG. 2 is a schematic view of an optical film according to the present invention.

As shown in FIG. 2, the optical film of the present invention includes a substrate 201, and a resin coating 203 having a convex-concave structure on at least one surface of the substrate to serve as a light diffusion layer. The resin coating includes a plurality of organic particles 205 and a binder 204. The organic particles are in an amount from about 110 to about 360 parts by weight per 100 parts by weight of the solids content of the binder.

The substrate 201 used in the optical film of the present invention can be any substrate known to persons having ordinary skill in the art, such as glass or plastic. The plastic substrate is not particularly limited and can be any one known to persons having ordinary skill in the art, which includes, for example, but is not limited to, polyester resins, such as polyethylene terephthalate (PET) and polyethylene naphthalate (PEN); polyacrylate resins, such as polymethyl methacrylate (PMMA); polyimide resins; polystyrene resins; polycycloolefin resins; polyolefin resins; polycarbonate resins; polyurethane resins; triacetate cellulose (TAC); or a mixture thereof. The preferred substrates are those formed from polyethylene terephthalate, polymethyl methacrylate, polycycloolefin resin, or triacetate cellulose, or a mixture thereof. More preferably, the substrate is polyethylene terephthalate. The thickness of the first optical layer is preferably in the range from 16 μm to 250 μm, usually depending on the desired purpose of an optical product.

In order to achieve a light diffusion effect, the resin coating 203 on one surface of the substrate 201 contains the organic particles 205 and the binder 204. The organic particles 205 contained in the resin coating 203 are formed from a polymethacrylate resin that contains at least one mono-functional acrylate monomer and at least one multi-functional acrylate monomer as the polymerization units, and all the multi-functional acrylate monomers are in an amount from about 30 wt % to 70 wt % based on the total weight of the monomers. According to the present invention, at least one multi-functional monomer is used, such that the monomers undergo crosslinking reaction with each other, and the crosslinking degree of the obtained organic particles can be enhanced. Therefore, the hardness of the organic particles is enhanced so as to enhance the scratch resistance and wear resistance properties of the organic particles, and to improve the solvent resistance property of the particles.

The mono-functional acrylate monomer suitable for the present invention is selected from, but not limited to, the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, hydroxyethyl acrylate (HEA), and 2-hydroxyethyl methacrylate (HEMA), and a mixture thereof.

The multi-functional acrylate monomer suitable for the present invention is selected from, but not limited to, the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl)isocyanurate, and a mixture thereof.

According to a preferred embodiment of the present invention, the organic particles 205 contained in the resin coating 203 are polyacrylate resin particles formed from the monomers containing methyl methacrylate and ethylene glycol dimethacrylate, where the weight ratio of the methyl methacrylate monomer to the ethylene glycol dimethacrylate monomer can be 70:30, 60:40, 50:50, 40:60 or 30:70. When the amount of the ethylene glycol dimethacrylate monomer is about 30 wt % to about 70 wt % based on the total weight of the monomers, a preferable crosslinking degree can be obtained.

According to the present invention, the shape of the plurality of the organic particles 205 contained in the resin coating 203 is not particularly limited, and can be, for example, spherical or elliptic or irregular shapes, of which the spherical shape is preferred. The organic particles have a single mean particle size ranging from about 5 μm to about 30 μm, preferably from about 8 μm to about 20 μm. More preferably, the organic particles have a mean particle size of about 8, 10, 12, 15, 18, or 20 μm. The organic particles provide a light scattering effect. In order to enhance the brightness of the optical film, the organic particles used in the present invention have a narrow particle size distribution, ranging within about ±30%, and preferably ranging within about ±15% of the mean particle size of the particles. For example, according to the present invention, if the organic particles having a mean particle size of about 15 μm and a particle size distribution ranging within about ±30% of the mean particle size are used, the particle size distribution of the organic particles in the resin coating ranges within about 10.5 μm to about 19.5 μm. As compared with the organic particles having a mean particle size of about 15 μm and a particle size distribution within about 1 μm to about 30 μm used in the prior art, the organic particles used in the present invention not only have a single mean particle size, but the particle size distribution is relatively narrow, so the present invention can avoid wastes of the light source caused by an excessively large light scattering range due to the significant difference in the particle size of the organic particles, thereby enhancing the brightness of the optical film.

As previously described, in the resin coating of the present invention, the organic particles are in an amount from about 110 to about 360 parts by weight per 100 parts by weight of the solids content of the binder, preferably about 120 to about 250 parts by weight per 100 parts by weight of the solids content of the binder. The distribution of the organic particles in the resin coating according to the present invention is not particularly limited, and preferably, as shown in FIG. 2, the organic particles are uniformly distributed in a single layer. The single-layer uniform distribution can not only reduce the raw material cost, but also reduce the wastes of the light source, thus enhancing the brightness of the optical film.

The binder used in the present invention is preferably colorless and transparent, so as to allow the light to pass there through. The binder of the present invention can be selected from the group consisting of a ultraviolet (UV) curing resin, a thermal setting resin, and a thermal plastic resin, and a mixture thereof, which is optionally processed by heat curing, UV curing, or heat and UV dual curing, so as to form the resin coating of the present invention. In an embodiment of the present invention, in order to enhance the hardness of the coating and prevent the film from warping, the binder contains a UV curing resin and a resin selected from the group consisting of a thermal setting resin and a thermal plastic resin and a mixture thereof, and is treated by heat and UV dual curing, so as to form a resin coating with excellent heat-resistant property and extremely low volume shrinkage.

The UV curing resin useful in the present invention is formed from at least one acrylic monomer or acrylate monomer having one or more functional groups, of which the acrylate monomer is preferred. The acrylate monomer suitable for the present invention includes, but is not limited to, a methacrylate monomer, an arcrylate monomer, a urethane acrylate monomer, a polyester acrylate monomer, or an epoxy acrylate monomer, and preferably an arcrylate monomer.

For example, the acrylate monomer suitable for the UV curing resin used in the present invention is selected from the group consisting of methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, hydroxyethyl acrylate (HEA), 2-hydroxyethyl methacrylate (HEMA), tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl) isocyanurate, and a mixture thereof. Preferably, the acrylate monomers contain dipentaerythritol hexaacrylate, trimethylolpropane triacrylate, and pentaerythritol triacrylate.

In order to improve the film-forming property of the resin coating 203, the UV curing resin used in the present invention can optionally contain an oligomer having a molecular weight in a range from $10^3$ to $10^4$. Such oligomers are well known to persons having ordinary skill in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The thermal setting resin suitable for the present invention typically has an average molecular weight in a range from $10^4$ to $2 \times 10^6$, preferably from $2 \times 10^4$ to $3 \times 10^5$, and more preferably from $4 \times 10^4$ to $10^5$. The thermal setting resin of the present invention can be selected from the group consisting of a carboxyl (—COOH) and/or hydroxyl (—OH) group-containing polyester resin, epoxy resin, polyacrylate resin, polymethacrylate resin, polyamide resin, fluoro resin, polyimide resin, polyurethane resin, and alkyd resin, and a mixture thereof, of which the polymethacrylate resin or polyacrylate resin containing a carboxy (—COOH) and/or hydroxyl (—OH) group is preferred, such as a polymethacrylic polyol resin.

The thermal plastic resin that can be used in the present invention is selected from the group consisting of polyester resins; polymethacrylate resins, such as polymethyl methacrylate (PMMA); and a mixture thereof.

The thickness of the resin coating of the optical film of the present invention normally depends on the requirements of the desired product, and is typically in the range from about 5 μm to about 30 μm, preferably in the range from about 10 μm to about 25 μm.

In addition to the organic particles and the binder, the resin coating of the present invention may optionally contain any additives known to persons having ordinary skill in the art, which include, but are not limited to, a leveling agent, a stabilizing agent, an anti-static agent, a curing agent, a fluorescent whitening agent, a photo initiator, a UV absorber, or inorganic particulates.

The anti-static agent suitable for the present invention is not particularly limited, and can be any anti-static agent well known to persons having ordinary skill in the art, such as ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like.

The curing agent suitable for the present invention can be any curing agent well known to persons having ordinary skill in the art and capable of making the molecules to be chemically bonded with each other to form crosslinking, and can be, for example, but is not limited to, polyisocyanate. When the resin coating of the present invention contains a curing agent, the organic particles of the present invention may optionally be prepared from the monomers containing a hydroxyl group (—OH), a carboxy group (—COOH), or an amino group (—NH$_2$), preferably a hydroxyl group, such that the organic particles can contain surface functional groups and can directly react with the curing agent in the resin coating, so as to improve the adhesion, to reduce the amount of the binder, and to enhance the brightness of the optical film. Examples of the monomers containing a hydroxyl group include, but are not limited to, hydroxyethyl acrylate (HEA), hydroxypropyl acrylate (HPA), 2-hydroxyethyl methacrylate (HEMA), and hydroxypropyl methacrylate (HPMA), and a mixture thereof.

The fluorescent whitening agent suitable for the present invention is not particularly limited, and can be any fluorescent whitening agent well known to persons having ordinary skill in the art, which can be an organic, including, for example, but being not limited to, a benzoxazole, benzimidazole, or diphenylethylene bistriazine; or an inorganic, including, for example, but being not limited to, zinc sulfide.

The UV absorber suitable for the present invention can be any UV absorber well known to persons having ordinary skill in the art, for example, a benzotriazole, a benzotriazine, a benzophenone, or a salicylic acid derivative.

The photo initiator used in the present invention will generate free radicals after being irradiated, and initiate a polymerization through delivering the free radicals. The photo initiator applicable to the present invention is not particularly limited. Preferably, the photo initiator is benzophenone or 1-hydroxy cyclohexyl phenyl ketone.

Moreover, when the substrate 201 is a plastic substrate, in order to prevent the plastic substrate from yellowing, inorganic particulates capable of absorbing UV light can be optionally added to the resin coating 203, which can be, for example, but are not limited to, zinc oxide, strontium titanate, zirconia, alumina, titanium dioxide, calcium sulphate, barium sulfate, or calcium carbonate, or a mixture thereof, of which titanium dioxide, zirconia, alumina, zinc oxide, or a mixture thereof is preferred. The particle size of the above-mentioned inorganic particulates is typically in the range from about 1 nanometer (nm) to about 100 nm, preferably from about 20 nm to about 50 nm.

Figure 3:
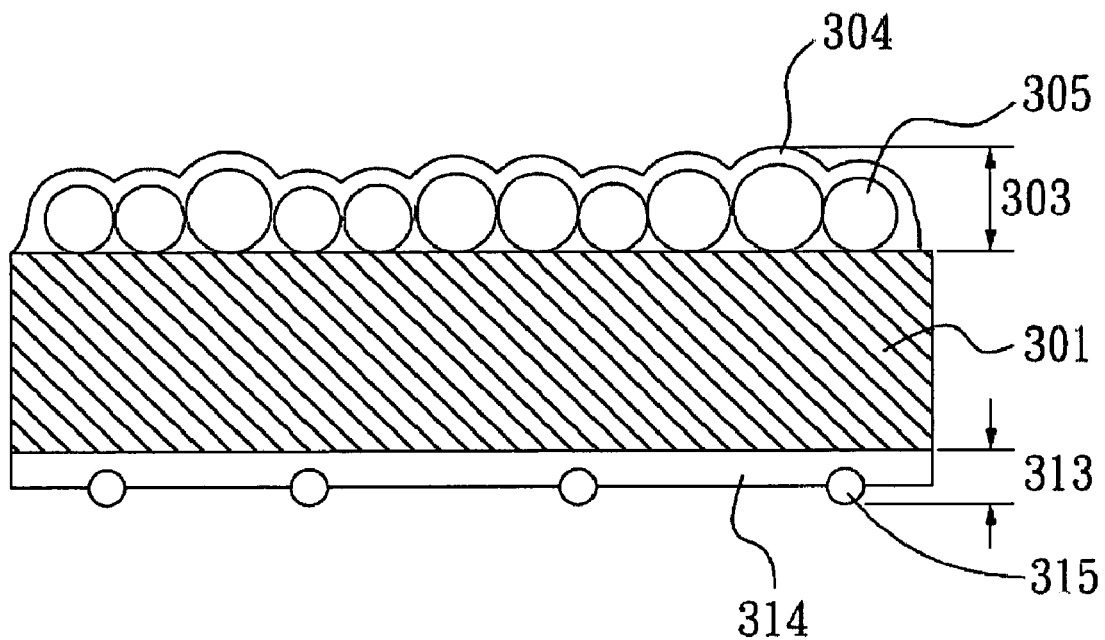
FIG. 3 is a schematic view of another optical film according to the present invention.

In order to avoid the adsorption effect between the optical film of the present invention and other backlight module elements and to improve the diffusion effect, in the optical film of the present invention, an anti-adhesion layer with a thickness in the range from about 5 μm to about 10 μm is optionally coated on the other side of the substrate. As shown in FIG. 3, in another embodiment of the present invention, the substrate 301 has the resin coating 303 containing a plurality of organic particles 305 and a binder 304 on one side and has an anti-adhesion layer 313 containing a plurality of organic particles 315 and a binder 314 on the other side.

The types of the binder 314 and organic particles 315 applicable for the anti-adhesion layer 313 are as those defined hereinbefore.

The organic particles 315 are in an amount from about 0.1 to about 5 parts by weight per 100 parts by weight of the solids content of the binder 314. The organic particles 315 have a mean particle size from about 5 μm to about 10 μm, preferably about 5, 8, or 10 μm, most preferably about 8 μm. The particle size distribution of the organic particles 315 is not particularly limited, which can be a wide particle size distribution or a narrow particle size distribution, and can also be a single-peak distribution or a multi-peak distribution. In other words, the organic particles having a single mean particle size and having a particle size distribution ranging within about ±30% of the mean particle size can also be used to prepare the anti-adhesion layer.

The anti-adhesion layer and the resin coating of the optical film of the present invention can have the same or different compositions. In other words, the same or different organic particles, binders, and optional additives are used to compose the anti-adhesion layer and the resin coating. According to an embodiment of the present invention, the type of the organic particles 315 in the anti-adhesion layer 313 are the same as that of the organic particles 305 in the resin coating 303. According to the present invention, the anti-adhesion layer may contain any additives known to persons having ordinary skill in the art, including, for example, but being not limited to, a leveling agent, a stabilizing agent, an anti-static agent, a curing agent, a fluorescent whitening agent, a photo initiator, a UV absorber, or inorganic particulates. The types of the above-mentioned additives, including the anti-static agent, curing agent, fluorescent whitening agent, photo initiator, UV absorber and inorganic particulates, are as those described hereinbefore.

The optical film of the present invention has a haze in the range of about 80% to about 98% as measured according to JIS K7136 standard method, and preferably, has a total light transmittance of no less than about 60% as measured according to JIS K7136 standard method. Therefore, the optical film of the present invention can be used in light source devices, for example, advertising light boxes and flat panel displays, particularly in liquid crystal displays. The inventive optical film is disposed above the light-emitting surface of a surface light source device as a diffusion film, thereby achieving the efficacy of diffusing the light. Moreover, the optical film of the present invention not only can effectively diffuse the light, but also has a desirable brightness, such that two or three optical films of the present invention can be used as diffusion films as a substitute for the conventional design with a brightness enhancement film in combination with other diffusion films, to provide desirable light diffusion efficiency and brightness.

Figure 4:
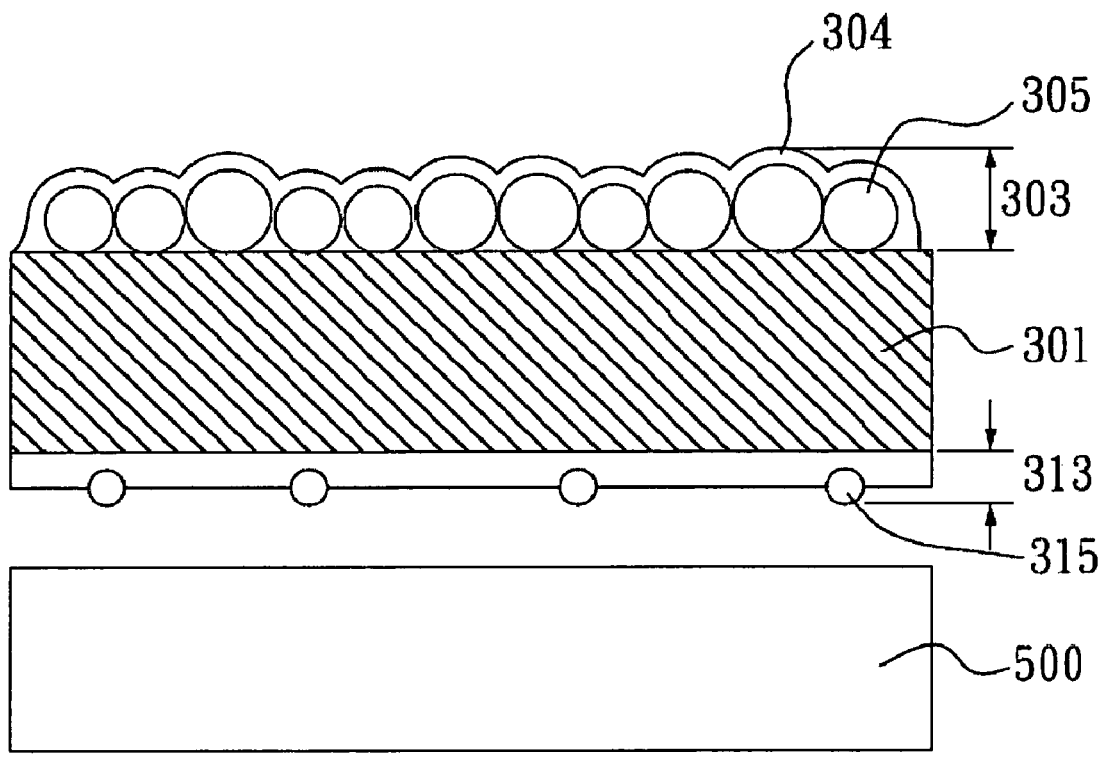
FIG. 4 is a schematic view of an embodiment of the present invention that includes the optical film according to the present invention in combination with a light guide plate or a diffusion film.
Figure 5:
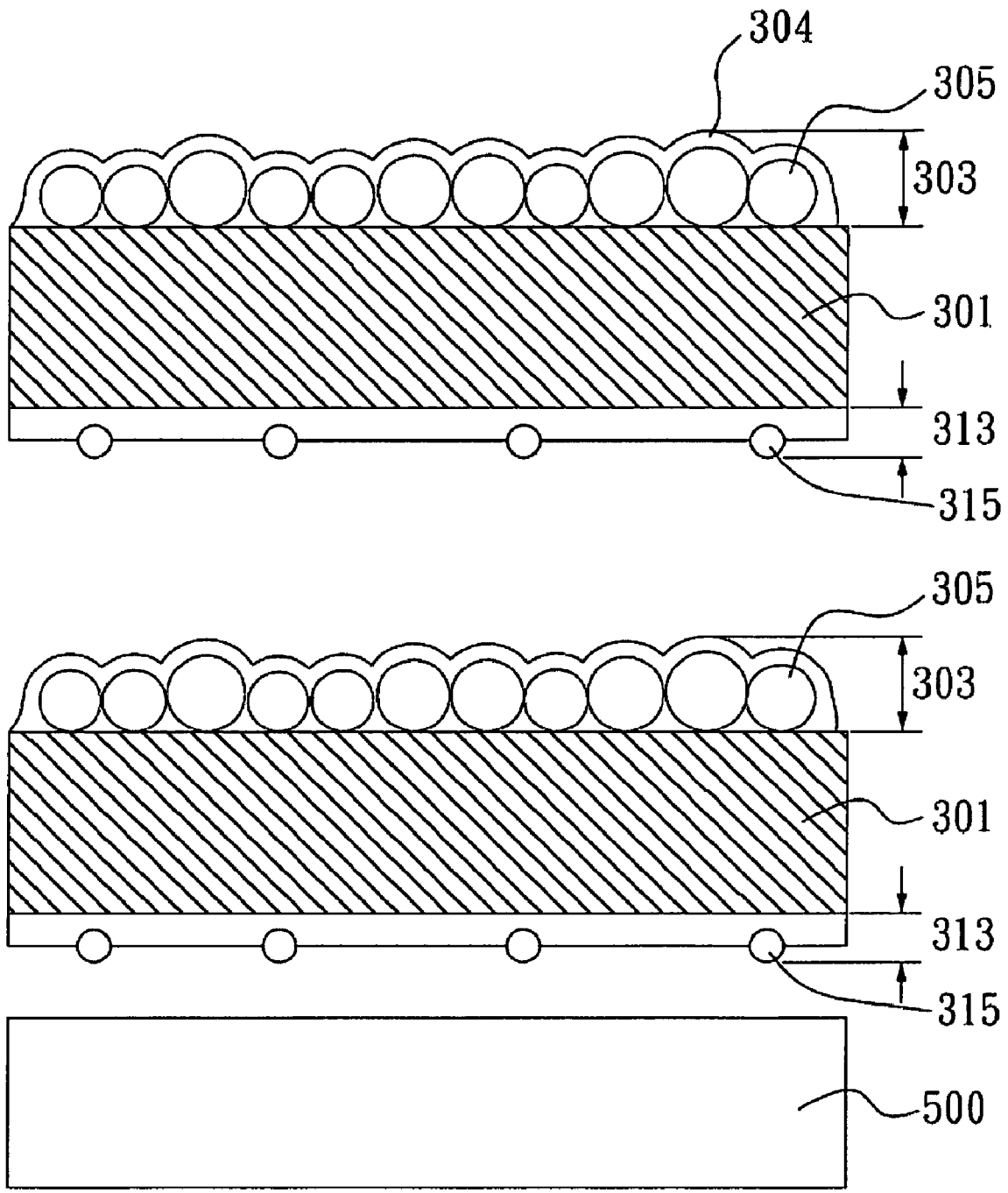
FIG. 5 is a schematic view of another embodiment of the present invention that includes the optical film according to the present invention in combination with a light guide plate or a diffusion film.
Figure 6:
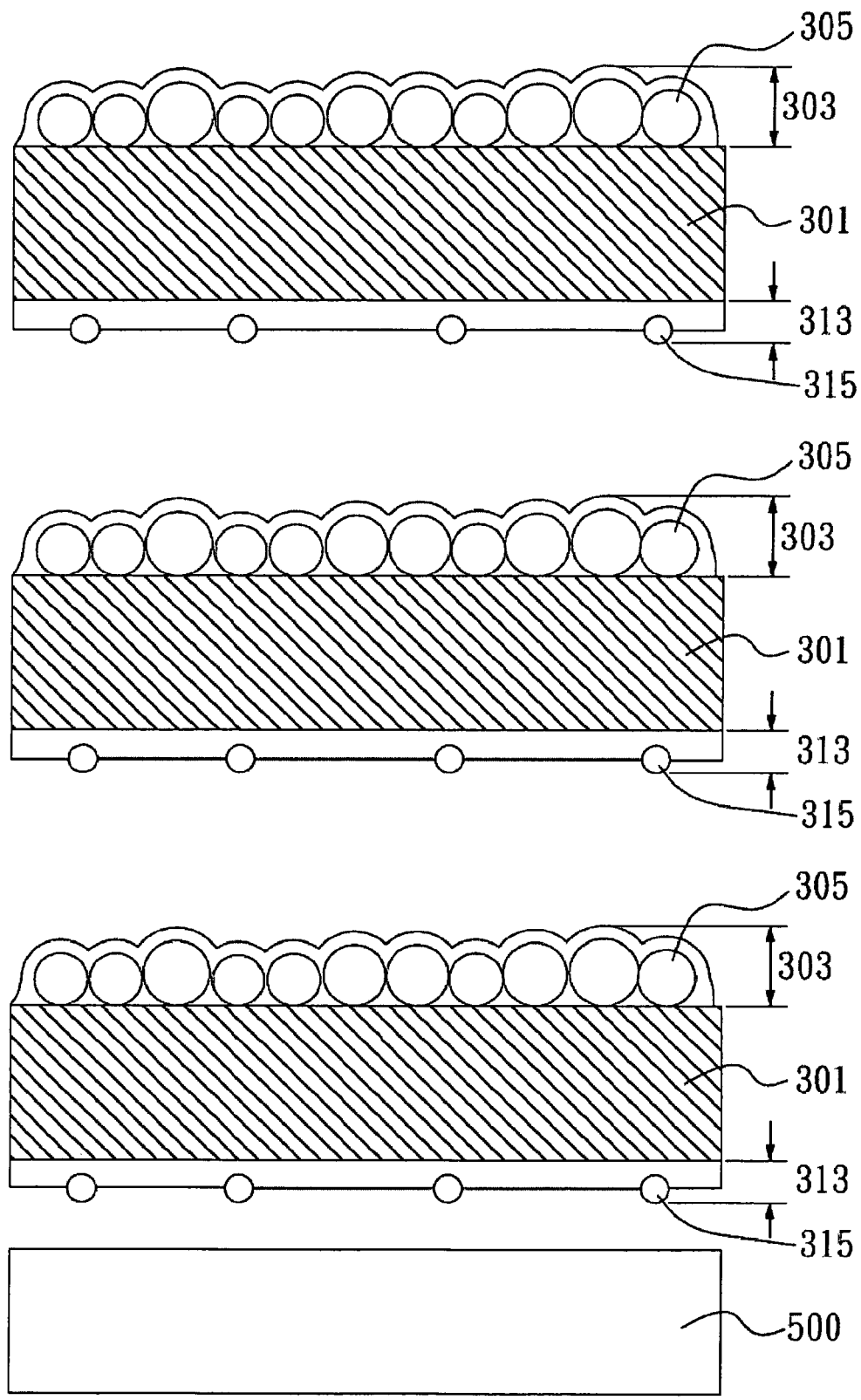
FIG. 6 is a schematic view of yet another embodiment of the present invention that includes the optical film according to the present invention in combination with a light guide plate or a diffusion film.

As shown in FIG. 4, one piece of the optical film of the present invention as shown in FIG. 3 is stacked on the light guide plate or the diffusion plate 500. If necessary, the optical film of the present invention can be stacked repeatedly to improve the brightness, so as to achieve the effect of enhancing the brightness through using a plurality of diffusion layers. For example, as shown in FIG. 5, two pieces of the optical films of the present invention as shown in FIG. 3 are stacked on the light guide plate or the diffusion plate 500; or as shown in FIG. 6, three pieces of the optical films of the present invention as shown in FIG. 3 are stacked on the light guide plate or the diffusion plate 500. Furthermore, more than three optical films can be stacked depending upon the actual demands.

Figure 7:
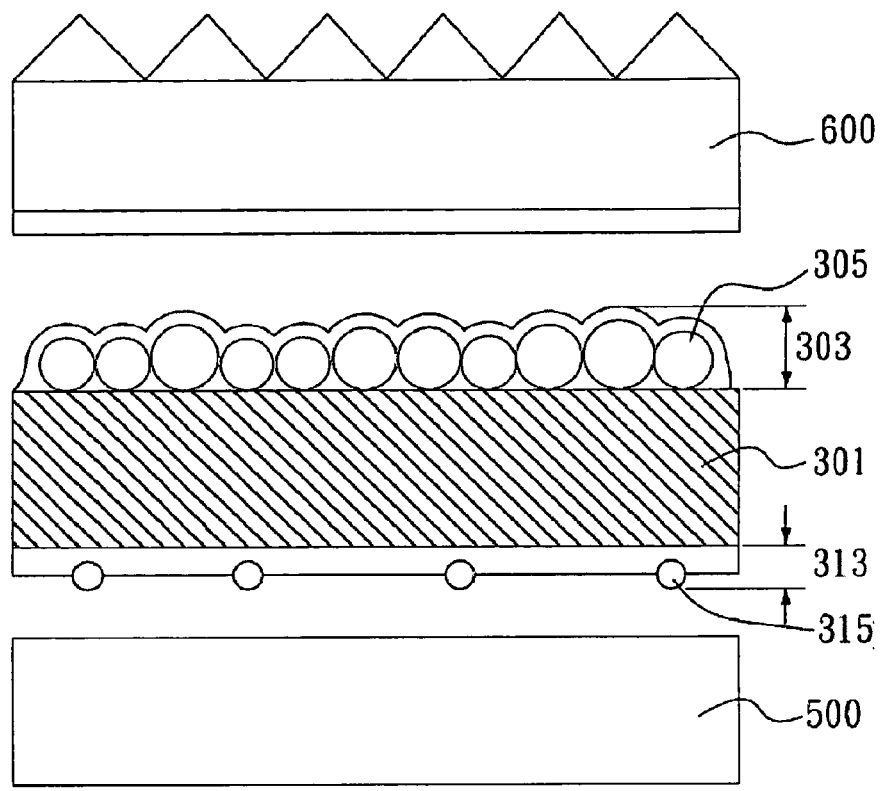
FIG. 7 is a schematic view of an embodiment of the present invention that includes the optical film according to the present invention in combination with a light guide plate or a diffusion film and a brightness enhancement film.

FIG. 7 relates to another application of the optical film of the present invention, in which one piece of the optical film as shown in FIG. 3 is stacked on the light guide plate or the diffusion plate 500, and a brightness enhancement film 600 is further stacked thereon. The brightness enhancement film suitable for this application is not particularly limited, and can be any brightness enhancement films known to persons having ordinary skill in the art.

Figure 8:
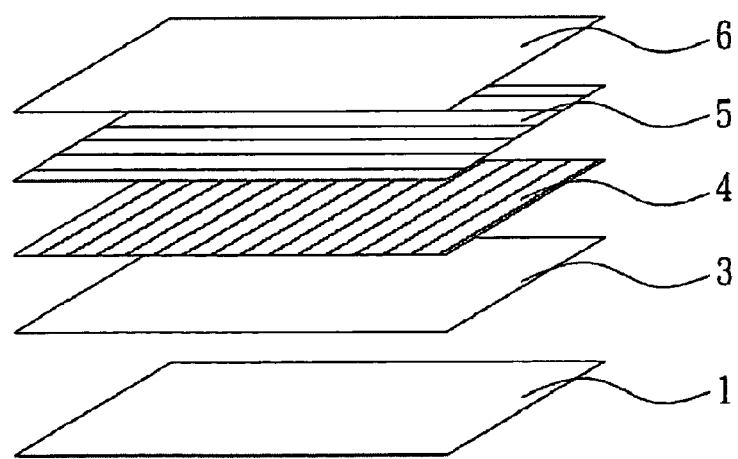
FIG. 8 is a schematic view of a conventional backlight module.

The optical film of the present invention can be used in a conventional backlight module as a diffusion film. As shown in FIG. 8, the optical films contained in a conventional backlight module are a reflection film (1), a diffusion film (3), brightness enhancement films (4) and (5), and a protective diffusion film (6) in sequence. The optical film of the present invention can be used as the diffusion film (3).

The following examples are used to further illustrate the present invention, but not intended to limit the scope of the present invention. Any modifications or alterations that can easily be accomplished by persons skilled in the art fall within the scope of the disclosure of the specification and the appended claims.

EXAMPLE 1

Preparation of Resin Coating

In a 250 mL glass bottle, a solvent of 22 g toluene and 12 g butyl acetate was added. 32 g of acrylic resin particles [FH-15HY2F2, Toyobo Company, Japan] [highly-crosslinked organic particles containing MMA and EGDMA monomers in a weight ratio of 60:40; having a particle size distribution of 15 μm±30%] having a mean particle size of 15 μm and 28 g of polymethyacrylic polyol resin [Eterac 7361-ts-50, Eternal Company] (with a solids content of about 50%) were added sequentially while stirring at a high speed, and then, 4 g of a curing agent [Desmodur 3390, Bayer Company] (with a solids content of about 75%), and 2 g of an anti-static agent [GMB-36M-AS, Marubishi Oil Chem. Co., Ltd] (with a solids content of about 20%) were added; and finally, about 100 g of a coating with a solids content of about 49% was prepared. Then, the coating was coated on a surface of a PET substrate (U34®, Toray Company) having a thickness of 188 μm with an RDS Bar Coater #12, dried for 1 minute at 120° C., to obtain a first coating (a resin coating) having a thickness of about 22 μm.

Preparation of Anti-Adhesion Layer

In a 250 mL glass bottle, a solvent of 24 g butanone, 22 g toluene, and 9 g butyl acetate was added. 1 g of acrylic resin particles [FH-8HY2F2, Toyobo Company, Japan] [highly-crosslinked organic particles containing MMA and EGDMA monomers in a weight ratio of 60:40; having a particle size distribution of 8 μm±30%] having a mean particle size of 8 μm, and 64 g of polymethyacrylic polyol resin [Eterac 7361-ts-50, Eternal Company] (with a solids content of about 50%) were sequentially added while stirring at a high speed; then, 8 g of a curing agent [Desmodur 3390, Bayer Company] (with a solids content of about 75%), 2 g of an anti-static agent [GMB-36M-AS, Marubishi Oil Chem. Co., Ltd] (with a solids content of about 20%) were added; and finally, about 130 g of a coating with a solids content of about 30% was prepared. Then, the coating was coated on the other surface of the PET substrate that was already coated with the first coating (the resin coating) on one surface with an RDS Bar Coater #12, dried for 1 minute at 120° C., to obtain a second coating (an anti-adhesion layer) having a thickness of about 8 μm. The resultant optical film had a total thickness of 218 μm.

EXAMPLE 2

Preparation of Resin Coating

In a 250 mL glass bottle, a solvent of 22 g toluene and 12 g butyl acetate was added. 28 g of acrylic resin particles [FH-8HY2F2, Toyobo Company, Japan] [highly-crosslinked organic particles containing MMA and EGDMA monomers in a weight ratio of 60:40; having a particle size distribution of 8 μm±30%] having a mean particle size of 8 μm and 40 g of polymethyacrylic polyol resin [Eterac 7361-ts-50, Eternal Company] (with a solids content of about 50%) were added sequentially while stirring at a high speed, and then, 5 g of a curing agent [Desmodur 3390, Bayer Company] (with a solids content of about 75%), and 2 g of an anti-static agent [GMB-36M-AS, Marubishi Oil Chem. Co., Ltd] (with a solids content of about 20%) were added; and finally, about 109 g of a coating with a solids content of about 47% was prepared. Then, the coating was coated on a surface of a PET substrate (U34®, Toray Company) having a thickness of 100 μm with an RDS Bar Coater #12, dried for 1 minute at 120° C., to obtain a first coating (a resin coating) having a thickness of about 12 μm.

Preparation of Anti-Adhesion Layer

In a 250 mL glass bottle, a solvent of 22.0 g butanone, 12.0 g toluene, and 12.0 g butyl acetate was added. 0.3 g of acrylic resin particles [FH-8HY2F2, Toyobo Company, Japan] [highly-crosslinked organic particles containing MMA and EGDMA monomers in a weight ratio of 60:40; having a particle size distribution of 8 μm±30%] having a mean particle size of 8 μm, and 48.0 g of polymethyacrylic polyol resin [Eterac 7361-ts-50, Eternal Company] (with a solids content of about 50%) were sequentially added while stirring at a high speed; then, 6.0 g of a curing agent [Desmodur 3390, Bayer Company] (with a solids content of about 75%), 2.0 g of an anti-static agent [GMB-36M-AS, Marubishi Oil Chem. Co., Ltd] (with a solids content of about 20%) were added; and finally, about 102.3 g of a coating with a solids content of about 28% was prepared. Then, the coating was coated on the other surface of the PET substrate that was already coated with the first coating (the resin coating) on one surface with an RDS Bar Coater #8, dried for 1 minute at 120° C., to obtain a second coating (an anti-adhesion layer) having a thickness of about 8 μm. The resultant optical film had a total thickness of 120 μm.

COMPARATIVE EXAMPLE 1

A commercially available diffusion film [CH283, SKC Company] with a thickness of 207 μm

COMPARATIVE EXAMPLE 2

A commercially available diffusion film [D120, Tsujiden Company] with a thickness of 120 μm Test Method A:

Film Thickness Test: The thicknesses of the films of Examples 1 and 2 and Comparative Examples 1 and 2 were measured with a coating thickness gauge (PIM-100, TESA Corporation) under 1 N pressing contact. The results were recorded above.

Testing Method B:

The properties of Examples 1 and 2 and Comparative Examples 1 and 2 were tested through the following methods.

Haze and Total Transmittance Test: According to JIS K7136 standard method, the test samples were measured for a haze (Hz) and total transmittance (Tt) with a NDH 5000 W Haze Meter (Nippon Denshoku Industries Co., Ltd.). The results are listed in Table 1 below.

Pencil Hardness Test: According to JIS K-5400 method, the test samples were tested with a Pencil Hardness Tester [Elcometer 3086, SCRATCH BOY], using Mitsubishi pencil (2H, 3H). The results of the test are shown in Table 1 below.

Surface Resistivity Test: The surface resistivity of the samples was measured with a Superinsulationk Meter [EASTASIA TOADKK Co., SM8220&SME-8310, 500 V]. The testing conditions were: 23±2° C., 55±5% RH. The results of the test are shown in Table 1 below.

Wear Resistance Test: A Linear Abraser [TABER 5750] was used, and a film (20 mm length×20 mm width) to be tested was affixed on a 600 g platform (area: 20 mm length× 20 mm width). The first coating of the film faces upwards, such that the first coating (the resin coating) is used to test the wear resistance under high pressure of the second coating (the anti-adhesion layer) of the same film under the test. The wear resistance test was performed in 10 cycles with a test path of 2 inches and a speed of 10 cycles/min. The results of the test are listed in Table 1 below.

Warp Test: The test films were cut into level films with 100 mm length×100 mm width, placed in an oven at 120° C. for 10 min, and then taken out and left at room temperature. After being cooled down to the room temperature, the films were measured for warping level on the four corners with a gap gauge (recording unit: millimeter (mm), recording manner: for example, 0;0;0;0), and thereby, the test samples were evaluated for heat resistance and warp resistance properties. The results of the test are listed in Table 1 below.

TABLE 1

|  | Example 1 | Example 2 | Comparative Example 1 | Comparative Example 2 |
|---|---|---|---|---|
| Haze, Hz (%) | 96.20 | 94.13 | 96.30 | 94.20 |
| Total Light Transmittance, Tt (%) | 72.30 | 92.20 | 72.50 | 91.40 |
| Pencil Hardness (the first diffusion layer) | 3H | 3H | 3H | 2H |
| Pencil Hardness (the second diffusion layer) | 3H | 3H | 2H | 2H |
| Surface Resistivity Ω/□ (the first diffusion layer) | $3.8 \times 10^{11}$ | $3.4 \times 10^{11}$ | $7.4 \times 10^{16}$ | $6.7 \times 10^{12}$ |
| Surface Resistivity Ω/□ (the second diffusion layer) | $9.0 \times 10^{11}$ | $6.8 \times 10^{11}$ | $3.4 \times 10^{12}$ | $2.3 \times 10^{12}$ |
| Wear Resistance Test of Diffusion Layer | Not scratched | Not scratched | Scratched | Scratched |
| Warp Test (mm) (120° C., 10 min) | 0; 0; 0; 0 | 0; 0; 0; 0 | 0.1; 0.1; 0.1; 0.1 | 0.2; 0.2; 0.2; 0.2 |

According to Table 1, the results of the examples and the comparative examples show that the optical films of the present invention have desirable anti-static property and high hardness property and have preferred surface evenness without warping, thus preventing the optical properties from being affected.

Testing Method C:

The films of Examples 1 and 2 and Comparative Examples 1 and 2, and the brightness enhancement films [PF-96S-188; PF-96S-125] produced by Eternal Company are assembled with backlight source 1 or 2 for form various modules for brightness evaluation.

Backlight Source 1: based on a 26" direct-type backlight source, constructed by disposing six U-type cold cathode fluorescent lamps (CCFLs) on an anti-UV reflection film and placing a 2 mm diffusion plate for uniformizing the light source.

Backlight Source 2: based on 15.4" side-type backlight source, constructed by disposing a light guide plate on a reflection film and placing a lamp reflector and a CCFL on each of the two sides of the light guide plate.

Brightness Measurement Method: Central brightness (cd/m²) and 13-point or 25-point brightness of the backlight sources and the modules were measured with a luminance meter, 2° angle [Topcon Company, SC-777] at a distance of 50 cm and normal direction (i.e., at an angle of 0°) from the backlight sources, and the brightness gain and the brightness uniformity were calculated in the following manners. The results were listed in Tables 2 and 3.

Brightness Gain: a central brightness value of a certain module or backlight source was taken as a base value, the difference between the central brightness value and the base value was divided by the base value and then multiplied by 100%, so as to get the brightness gain of the module or backlight source under test as compared with another module or backlight source.

Brightness Uniformity: the minimum brightness value obtained from the 13-point or 25-point brightness tests was divided by the maximum brightness value and then multiplied by 100% (namely, minimum brightness value/maximum brightness value×100%).

TABLE 2

| 26" Direct-type Backlight Source | Central Brightness (cd/m²) | Brightness Gain (%) | 25-point Brightness Uniformity (%) |
|---|---|---|---|
| Backlight Source 1 | 8,353 | 0 | 95.7 |
| Backlight Source 1 + one film of Example 1 | 11,444 | +37 | 95.6 |
| Backlight Source 1 + two films of Example 1 | 12,195 | +46 | 95.6 |
| Backlight Source 1 + three films of Example 1 | 12,362 | +48 | 95.5 |
| Backlight Source 1 + one film of Example 1 and one brightness enhancement film (PF-96S-188) | 15,119 | +81 | 95.2 |
| Backlight Source 1 + two films of Comparative Example 1 | 11,694 | +40 | 95.4 |

It can be seen from Table 2 that the original 26" direct-type backlight source has a central brightness of 8,353 cd/m², and if one film of Example 1 is additionally used, a brightness gain of 37% can be obtained and the brightness is enhanced up to 11,444 cd/m²; if two films of Example 1 are additionally used, a brightness gain of 46% can be obtained and the brightness is enhanced up to 12,195 cd/m²; if three films of Example 1 are additionally used, a brightness gain of 48% can be obtained and the brightness is enhanced up to 12,362 cd/m²; and if one film of Example 1 and one brightness enhancement film (PF-96S-188) are additionally used, a brightness gain of 81% can be obtained and the brightness is enhanced up to 15,119 cd/m². However, a module composed of the backlight source 1 plus two films of Comparative Example 1 can merely provide a brightness gain of 40% and a brightness of 11,694 cd/m². As compared with the module composed of the backlight source 1 plus two films of Comparative Example 1, the module composed of the backlight source 1 plus two films of Example 1 of the present invention can provide a preferred brightness gain.

In addition, it can be seen from Table 2 that the backlight source 1 plus two films of Example 1, the backlight source 1 plus three films of Example 1, the backlight source 1 plus one film of Example 1 and one brightness enhancement film can significantly improve the brightness, and can maintain the 25-point brightness uniformity at a level of higher than 95%. Therefore, the optical film of the present invention is applicable for the backlight modules of LCDs and liquid crystal TV sets, and can effectively diffuse the light and provide desirable brightness, so that it can be used as a substitute for a conventional design.

TABLE 3

| 15.4" Side-type Backlight Source | Central Brightness (cd/m$^2$) | 13-Point Brightness Uniformity (%) |
|---|---|---|
| Backlight Source 2 + one film of Example 2 and two brightness enhancement films (PF-96S-125) | 3,375 | 86.7 |
| Backlight Source 2 + one film of Comparative Example 2 and two brightness enhancement films (PF-96S-125) | 3,125 | 86.5 |

It can be seen from Table 3 that the central brightness of the backlight source 2 added with one film of Example 2 and two brightness enhancement films (PF-96S-125) is 3,375 cd/m2, and the central brightness of the backlight source 2 added with one film of Comparative Example 2 and two brightness enhancement films (PF-96S-125) is 3,125 cd/m2. The brightness of the module using the films of Example 2 of the present invention is increased by 250 cd/m$^2$, that is, by 8%, as compared with that of the module using the films of Comparative Example 2, and meanwhile, an equivalent uniformity is maintained. Therefore, the optical film of the present invention can effectively diffuse the light and provide desirable brightness and is applicable for the backlight modules of LCDs and notebook computers.

What is claimed is:

1. An optical film, comprising a substrate and a resin coating having a convex-concave structure on at least one surface of the substrate, wherein the resin coating comprises a plurality of organic particles and a binder, the organic particles being formed from a polyacrylate resin comprising at least one mono-functional acrylate monomer and at least one multi-functional acrylate monomer as the polymerization units, wherein the multi-functional acrylate monomers are in an amount from about 30 wt % to 70 wt % based on the total weight of the monomers; the organic particles have a single mean particle size; the particle size distribution of the organic particles ranges within about ±30% of the mean particle size; and the organic particles are in an amount from about 110 to about 360 parts by weight per 100 parts by weight of the solids content of the binder.

2. The optical film as claimed in claim 1, wherein the particle size distribution of the organic particles contained in the resin coating ranges within about ±15% of the mean particle size.

3. The optical film as claimed in claim 1, wherein the mean particle size of the organic particles is in a range of about 5 μm to about 30 μm.

4. The optical film as claimed in claim 1, wherein the mean particle size of the organic particles is in a range of about 8 μm to about 20 μm.

5. The optical film as claimed in claim 1, wherein the organic particles contained in the resin coating are in an amount from about 120 to about 250 parts by weight per 100 parts by weight of the solids content of the binder.

6. The optical film as claimed in claim 1, wherein the resin coating has a thickness of about 5 μm to about 30 μm.

7. The optical film as claimed in claim 1, wherein the mono-functional acrylate monomer is selected from the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, methacrylate, hydroxyethyl acrylate (HEA), and 2-hydroxyethyl methacrylate (HEMA), and a mixture thereof.

8. The optical film as claimed in claim 1, wherein the multi-functional acrylate monomer is selected from the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, pentaerythritol tetraacrylate, dipentaerythritol hexaacrylate, tripropylene glycol di-methacrylate, 1,4-butanediol dimethacrylate, 1,6-hexanediol dimethacrylate, allylated cyclohexyl dimethacrylate, isocyanurate dimethacrylate, ethoxylated trimethylol propane tri-methacrylate, propoxylated glycerol tri-methacrylate, trimethylol propane tri-methacrylate, and tris(acryloxyethyl)isocyanurate, and a mixture thereof.

9. The optical film as claimed in claim 1, wherein the polyacrylate resin is formed from the monomers containing methyl methacrylate and ethylene glycol dimethacrylate.

10. The optical film as claimed in claim 1, wherein the substrate has an anti-adhesion layer on the other surface opposite to the surface where the resin coating is located thereon, and the anti-adhesion layer comprises a plurality of organic particles and a binder.

11. The optical film as claimed in claim 10, wherein the organic particles contained in the anti-adhesion layer have a mean particle size in the range of about 5 μm to about 10 μm.

12. The optical film as claimed in claim 11, wherein the organic particles contained in the anti-adhesion layer have a particle size distribution ranging within about ±30% of the mean particle size.

13. The optical film as claimed in claim 10, wherein the organic particles contained in the anti-adhesion layer are in an amount from about 0.1 to about 5 parts by weight per 100 parts by weight of the solids content of the binder.

14. The optical film as claimed in claim 10, wherein the anti-adhesion layer has a thickness of about 5 μm to about 10 μm.

15. The optical film as claimed in claim 10, wherein the organic particles contained in the anti-adhesion layer are formed from a polyacrylate resin.

16. The optical film as claimed in claim 15, wherein the polyacrylate resin is formed from the monomers containing methyl methacrylate and ethylene glycol dimethacrylate.

17. The optical film as claimed in claim 16, wherein the ethylene glycol dimethacrylate monomer are in an amount of about 30 wt % to about 70 wt % based on the total weight of the monomers.

18. The optical film as claimed in claim 1, wherein the substrate is selected from the group consisting of a polymethacrylate resin, a polycarbonate resin, a polystyrene resin, a polycycloolefin resin, a polyolefin resin, a polyurethane resin, a triacetate cellulose, a polyimide resin, and a polyester resin, and a mixture thereof.

19. The optical film as claimed in claim 18, wherein the substrate is selected from the group consisting of polyethylene terephthalate, polymethacrylate, polycycloolefin resin, and triacetate cellulose, and a mixture thereof.

20. The optical film as claimed in claim 10, wherein the binder contained in the resin coating or the anti-adhesion layer is selected from the group consisting of a ultraviolet (UV) curing resin, a thermal setting resin, and a thermal plastic resin, and a mixture thereof.

21. The optical film as claimed in claim 20, wherein the binder contained in the resin coating or the anti-adhesion layer comprises a UV curing resin and a resin selected from the group consisting of a thermal setting resin and a thermal plastic resin and a mixture thereof.

22. The optical film as claimed in claim 20, wherein the UV curing resin is formed from at least one acrylic monomer or acrylate monomer having one or more functional groups.

23. The optical film as claimed in claim 22, wherein the acrylate monomer is selected from the group consisting of a methacrylate monomer, an acrylate monomer, a urethane acrylate monomer, a polyester acrylate monomer, and an epoxy acrylate monomer.

24. The optical film as claimed in claim 22, wherein the UV curing resin further comprises an acrylate oligomer.

25. The optical film as claimed in claim 20, wherein the thermal setting resin is selected from the group consisting of a carboxyl (—COOH) and/or hydroxyl (—OH) group-containing polyester resin, epoxy resin, polyacrylate resin, polymethacrylate resin, polyamide resin, fluoro resin, polyimide resin, polyurethane resin, and alkyd resin, and a mixture thereof.

26. The optical film as claimed in claim 20, wherein the thermal plastic resin is selected from the group consisting of a polyester resin and a polymethacrylate resin and a mixture thereof.

27. The optical film as claimed in claim 10, wherein the resin coating and the anti-adhesion layer independently comprise an additive selected from the group consisting of a leveling agent, a stabilizing agent, an anti-static agent, a curing agent, a fluorescent whitening agent, a photo initiator, a UV absorber, and inorganic particulates.

28. The optical film as claimed in claim 27, wherein the anti-static agent is selected from the group consisting of ethoxy glycerin fatty acid esters, quaternary amine compounds, aliphatic amine derivatives, polyethylene oxide, siloxane, and alcohol derivatives.

29. The optical film as claimed in claim 27, wherein the curing agent is polyisocyanate.

30. The optical film as claimed in claim 27, wherein the inorganic particulates are selected from the group consisting of zinc oxide, strontium titanate, zirconia, alumina, titanium dioxide, calcium sulphate, barium sulfate, and calcium carbonate, and a mixture thereof.

31. The optical film as claimed in claim 1, which is for use as a diffusion film.

* * * * *